(12) United States Patent
Okuma et al.

(10) Patent No.: US 10,094,276 B2
(45) Date of Patent: Oct. 9, 2018

(54) MULTI-LINK PISTON-CRANK MECHANISM FOR INTERNAL COMBUSTION ENGINE

(71) Applicant: NISSAN MOTOR CO., LTD., Yokohama-shi, Kanagawa (JP)

(72) Inventors: Satoru Okuma, Kanagawa (JP); Takashi Tanabe, Kanagawa (JP); Katsuya Moteki, Kanagawa (JP)

(73) Assignee: NISSAN MOTOR CO., LTD., Yokohama-shi (JP)

( * ) Notice: Subject to any disclaimer, the term of this patent is extended or adjusted under 35 U.S.C. 154(b) by 0 days.

(21) Appl. No.: 14/914,752

(22) PCT Filed: Jul. 29, 2014

(86) PCT No.: PCT/JP2014/069878
§ 371 (c)(1),
(2) Date: Feb. 26, 2016

(87) PCT Pub. No.: WO2015/029671
PCT Pub. Date: Mar. 5, 2015

(65) Prior Publication Data
US 2016/0208687 A1    Jul. 21, 2016

(30) Foreign Application Priority Data

Aug. 27, 2013 (JP) ................................. 2013-175199

(51) Int. Cl.
*F02B 75/32* (2006.01)
*F16C 9/04* (2006.01)
(Continued)

(52) U.S. Cl.
CPC ............ *F02B 75/32* (2013.01); *F02B 75/045* (2013.01); *F16C 7/00* (2013.01); *F16C 9/04* (2013.01);
(Continued)

(58) Field of Classification Search
CPC .......... F02B 75/32; F02B 75/045; F16C 7/00; F16C 9/04; F16C 11/02; F16C 23/041; F16C 2360/22
(Continued)

(56) References Cited

U.S. PATENT DOCUMENTS 6,648,513 B2 * 11/2003 Okamoto .................. F16C 9/04
                                                                    384/192
7,378,444 B2 *  5/2008 Goodman ............... C07C 59/42
                                                                    514/549
(Continued)

FOREIGN PATENT DOCUMENTS

DE        101 30 253 A1    1/2003
EP         1 247 960 A2   10/2002
(Continued)

*Primary Examiner* — Joseph Dallo
*Assistant Examiner* — Yi-Kai Wang
(74) *Attorney, Agent, or Firm* — Foley & Lardner LLP

(57) ABSTRACT

A lower link (13) is formed such that outer circumferential sides of both end portions of a crankpin through-hole (21) are stiffer than a center portion of the crankpin through-hole (21), i.e. a bifurcation portion of a bifurcated shape thereof. The both end portions of the crankpin through-hole (21) are formed such that inner circumferential surfaces (22a) of the both end portions are curved at a predetermined curvature in an axial direction of a crankshaft with no load input on the lower link (13). Moreover, the center portion of the crankpin through-hole (21) is formed such that an inner circumferential surface (22b) thereof is located inward of the inner circumferential surfaces (22a) of the both end portions and is straight in the axial direction of the crankshaft with no load input on the lower link (13).

6 Claims, 4 Drawing Sheets

(51) Int. Cl.
  *F16C 23/04* (2006.01)
  *F02B 75/04* (2006.01)
  *F16C 7/00* (2006.01)
  *F16C 11/02* (2006.01)

(52) U.S. Cl.
  CPC ............ *F16C 11/02* (2013.01); *F16C 23/041* (2013.01); *F16C 2360/22* (2013.01)

(58) Field of Classification Search
  USPC ..................................................... 123/197.3
  See application file for complete search history.

(56) References Cited

U.S. PATENT DOCUMENTS

| | | | | |
|---|---|---|---|---|
| 7,387,444 | B2* | 6/2008 | Shimizu | F16C 23/041 384/192 |
| 8,246,250 | B2* | 8/2012 | Keller | B21B 31/07 384/192 |
| 2004/0112169 | A1* | 6/2004 | Hiyoshi | F02B 75/048 74/579 R |
| 2007/0137608 | A1* | 6/2007 | Mizuno | F02B 75/32 123/197.4 |

FOREIGN PATENT DOCUMENTS

| | | |
|---|---|---|
| EP | 2 123 869 A1 | 11/2009 |
| GB | 1 380 947 A | 1/1975 |
| GB | 2 324 838 A | 11/1998 |
| JP | 05-302617 A | 11/1993 |

* cited by examiner

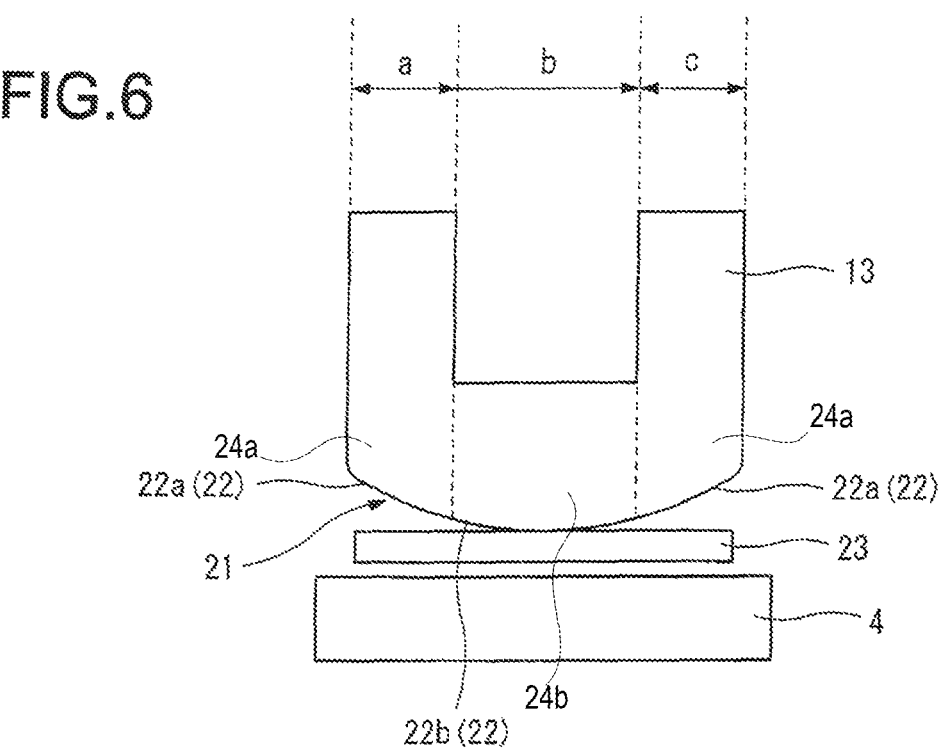

MULTI-LINK PISTON-CRANK MECHANISM FOR INTERNAL COMBUSTION ENGINE

TECHNICAL FIELD

The present invention relates to a multi-link piston-crank mechanism for an internal combustion engine.

BACKGROUND ART

For example, Patent Literature 1 discloses a so-called single-link piston-crank mechanism in which reciprocating motion of a piston is converted into rotational motion of a crankshaft by a con-rod. The con-rod includes a small end portion connected with a piston pin, a large end portion connected with a crankpin of a crankshaft, and a rod portion which combines the small end portion with the large end portion.

In the technique of Patent Literature 1, a bearing metal interposed between the large end portion and the crankpin includes a tubular radial bearing portion which is slidably in contact with the crankpin. For purpose of improving a surface contact between the bearing metal and the large end portion, a back surface of the radial bearing portion which is joined to the large end portion of the con-rod is constituted by a straight cylindrical surface and curved cylindrical surfaces. The straight cylindrical surface extends concentrically with its rotation axis whereas the curved cylindrical surfaces are curved in a barrel shape continuously from front and rear end portions of the straight cylindrical surface.

However, the technique of Patent Literature 1 is premised on the so-called single-link piston-crank mechanism, but does not deal with a possibility of the multi-link piston-crank mechanism. Moreover, the large end portion of the con-rod in the single-link piston-crank mechanism does not necessarily have the same structure as a linking member rotatably attached to the crankpin in the multi-link piston-crank mechanism.

That is, Patent Literature 1 merely examines a shape which improves the surface contact of the bearing metal slidably abutting on the crankpin, in the field of single-link piston-crank mechanism.

In the field of multi-link piston-crank mechanism, an improvement on the surface contact of the bearing metal slidably abutting on the crankpin remains room of examination.

CITATION LIST

Patent Literature

Patent Literature 1: Japanese Patent Application Publication No. H05-302617

SUMMARY OF THE INVENTION

A multi-link piston-crank mechanism according to the present invention comprises a lower link rotatably attached to a crankpin of a crankshaft, wherein the lower link is formed with a crankpin through-hole through which the crankpin is passing, and is rotatably attached to the crankpin through a cylindrical bearing metal held in the crankpin through-hole, wherein the lower link is formed such that rigidity of outer circumferential portions of both end portions of the crankpin through-hole is higher than rigidity of an outer circumferential portion of a center portion of the crankpin through-hole, and inner diameters of the both end portions of the crankpin through-hole are larger than an inner diameter of the center portion of the crankpin through-hole.

According to the present invention, a surface pressure against the bearing metal can be prevented from partially increasing, even if the crankpin through-hole is deformed at the time of load input. Therefore, the bearing metal can be inhibited from being partially worn out to a great degree.

BRIEF EXPLANATION OF DRAWINGS

FIG. 6 An explanatory view schematically showing a relevant part of a lower link under a condition that no load input is applied to the lower link in a second embodiment according to the present invention.

DETAILED DESCRIPTION OF INVENTION

Figure 1:
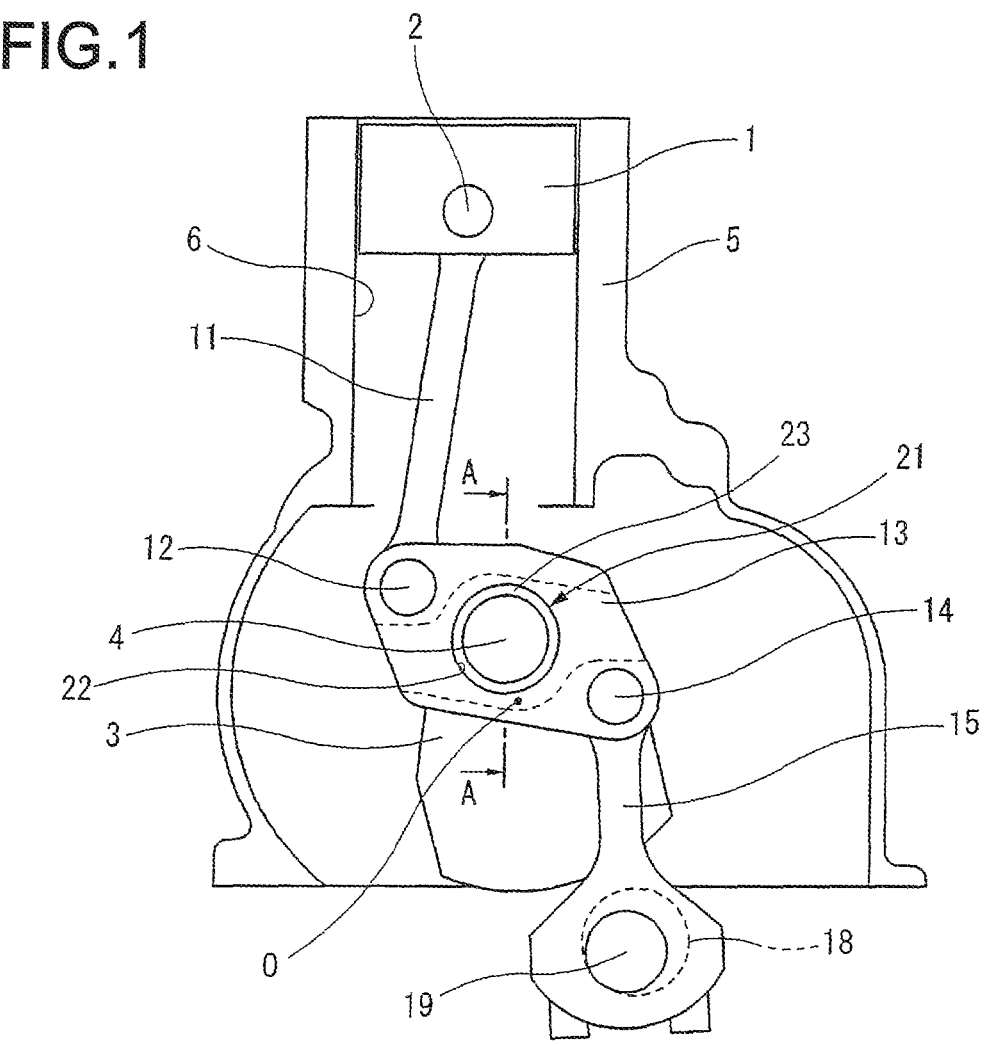
FIG. 1 An explanatory view of a multi-link piston-crank mechanism for an internal combustion engine to which the present invention has been applied.

Hereinafter, an embodiment according to the present invention will be explained in detail referring to the drawings.

FIG. 1 is an explanatory view schematically showing one example of basic configuration of a reciprocating variable compression-ratio internal combustion engine to which a multi-link piston-crank mechanism according to the present invention has been applied.

A piston 1 is provided in a cylinder 6 formed in a cylinder block 5 such that the piston 1 is slidable on the cylinder 6. One end of an upper link 11 is swingably connected with the piston 1 through a piston pin 2.

Another end of the upper link 11 is rotatably connected with one end portion of a lower link 13 through an upper pin 12. The upper pin 12 is provided as a first connecting pin. The lower link 13 is formed with a crankpin through-hole 21 located at a center portion of the lower link 13. A crankpin 4 of a crankshaft 3 is passing through the crankpin through-hole 21. The lower link 13 can be divided into two pieces in right and left directions or in upper and lower directions, for purpose of attaching the lower link 13 to the crankpin 4. These divided two pieces of the lower link 13 are integrated with each other by bolt(s) (not shown).

A cylindrical (tubular) bearing metal 23 is accommodated and held in the crankpin through-hole 21. In this embodiment, the bearing metal 23 is held and fixed to an inner circumferential surface 22 of the crankpin through-hole 21. That is, the lower link 13 is rotatably attached to the crankpin 4 through the bearing metal 23. It is noted that the crankshaft 3 rotates about (around) a point O.

One end of a control link 15 is rotatably connected with another end portion of the lower link 13 through a control pin 14. The control pin 14 is provided as a second connecting pin. Another end of the control link 15 is swingably supported by a part of main body of the internal combustion engine. A swing fulcrum of the another end of the control link 15 can be shifted in location relative to the main body of the internal combustion engine, in order to vary a compression ratio. Specifically, a control shaft 18 is provided to extend parallel to the crankshaft 3. An eccentric shaft 19 is provided in the control shaft 18 such that the eccentric shaft 19 has a center deviated from a center (axis) of the control shaft 18. The another end of the control link 15 is rotatably fitted over this eccentric shaft 19. The control shaft 18 is rotatably supported by the cylinder block 5, and is linked to a proper actuator mechanism (not shown).

Therefore, when the actuator mechanism drivingly rotates the control shaft 18 for purpose of varying the compression ratio, a location of the center of the eccentric shaft 19 which functions as the swing fulcrum of the control link 15 moves relative to the engine main body. Hence, a movement-restriction condition of the lower link 13 which is given by the control link 15 is changed such that a stroke position of the piston 1 relative to crank angle is changed. Thus, the compression ratio of the engine is varied.

The one end portion of the lower link 13 is formed in a bifurcated shape. The another end of the upper link 11 is sandwiched between or put into bifurcated two portions (i.e. the one end portion) of the lower link 13. In this embodiment, as shown by a dotted line in FIG. 1, the bifurcated shape formed in the one end portion of the lower link 13 is located in an upper portion of the lower link 13 with respect to the crankpin through-hole 21 (in FIG. 1) and extends to a location close to the another end portion of the lower link 13. Moreover, the another end portion of the lower link 13 is formed in a bifurcated shape. The one end of the control link 15 is sandwiched between or put into bifurcated two portions (the another end portion) of the lower link 13. In this embodiment, as shown by a dotted line in FIG. 1, the bifurcated shape formed in the another end portion of the lower link 13 is located in a lower portion of the lower link 13 with respect to the crankpin through-hole 21 (in FIG. 1) and extends to a location close to the one end portion of the lower link 13.

Figure 2:
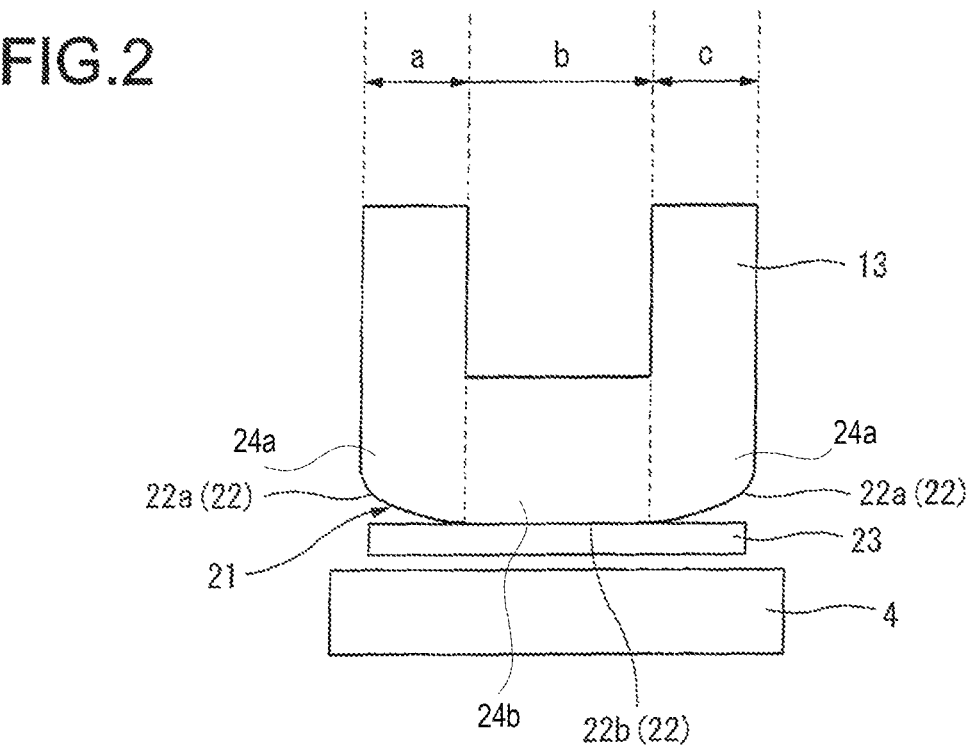
FIG. 2 An explanatory view schematically showing a relevant part of a lower link under a condition that no load input is applied to the lower link in a first embodiment according to the present invention.

As shown in FIG. 2, the lower link 13 in this embodiment has a rigidity of an outer circumferential portion of the crankpin through-hole 21, which varies along an axial direction of the crankshaft. That is, the lower link 13 is formed such that a rigidity of outer circumferential portions 24*a* of (axially) both end portions a and c of the crankpin through-hole 21 is higher than a rigidity of an outer circumferential portion 24*b* of a center portion b of the crankpin through-hole 21. This center portion of the crankpin through-hole 21 corresponds to a bottom portion of the bifurcated shape (i.e., corresponds to a base portion between the bifurcated two portions). FIG. 2 is an explanatory view schematically showing a part of a cross section of FIG. 1 taken along a line A-A. FIG. 2 represents a state where no load input is being applied to the lower link 13.

Figure 3:
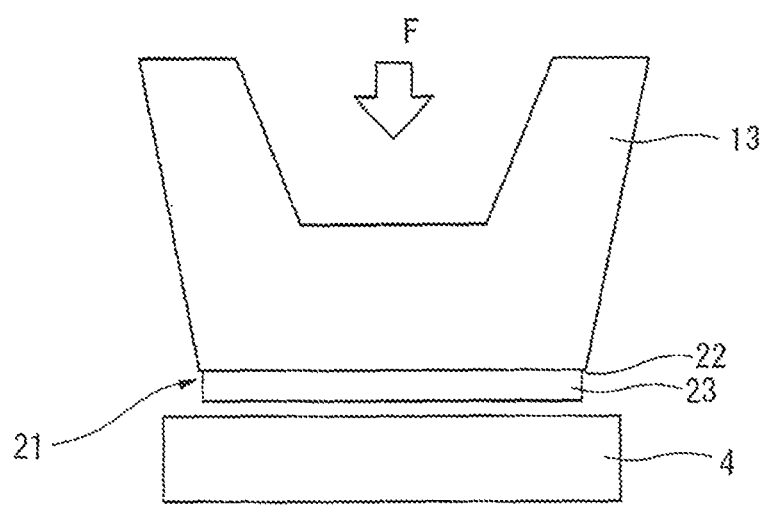
FIG. 3 An explanatory view schematically showing the relevant part of the lower link under a condition that load input is applied to the lower link in the first embodiment according to the present invention.

The crankpin through-hole 21 of the lower link 13 is formed such that a pressing force from the lower link 13 to the bearing metal 23 becomes uniform over (consistent across) a contact range of the lower link 13 with respect to the axial direction of the crankshaft when a load input caused by combustion load and the like is applied to the lower link 13. At the time of load input, the crankpin through-hole 21 is deformed (changed in shape) by an elastic deformation of the lower link 13. In this embodiment, as shown in FIG. 3, the crankpin through-hole 21 is formed such that the inner circumferential surface 22 of the crankpin through-hole 21 becomes in a straight-line shape in the axial direction of the crankshaft when a load input F caused by a maximum combustion load is applied to the lower link 13. FIG. 3 is an explanatory view schematically showing a part of a cross section of FIG. 1 taken along the line A-A. FIG. 3 represents a state where the load input F is being applied to the lower link 13.

The both end portions of the crankpin through-hole 21 are formed such that each of inner circumferential surfaces 22*a* of the both end portions of the crankpin through-hole 21 is curved (bent) at a predetermined curvature along (with respect to) the axial direction of the crankshaft when no load input is being applied to the lower link 13. That is, the both end portions of the crankpin through-hole 21 are formed in a so-called bell-mouth shape. The inner circumferential surface 22 of the crankpin through-hole 21 over ranges of a section a and a section c of FIG. 2 is formed in a curved shape to protrude (bulge) in a radially inner direction of the crankpin through-hole 21. Moreover, under the condition that no load is being inputted to the lower link 13, an inner circumferential surface 22*b* of the center portion of the crankpin through-hole 21 is located radially inward of (i.e., located inward beyond) the inner circumferential surfaces 22*a* of the both end portions of the crankpin through-hole 21, and extends straight in the axial direction of the crankshaft. That is, the center portion of the crankpin through-hole 21 is formed to have a constant inner diameter, and hence, the inner circumferential surface 22 of the crankpin through-hole 21 is in a straight-line shape over a range of a section b as shown in FIG. 2.

In other words, the crankpin through-hole 21 is formed to have an inner diameter which varies with an axial location of the crankpin through-hole 21 (i.e., varies along the axial direction of the crankshaft). Each of the both end portions (the section a and the section c) of the crankpin through-hole 21 which have a relatively high rigidity has an inner diameter which is more enlarged as an axial location of the inner diameter becomes closer to an end opening of the crankpin through-hole 21. On the other hand, the center portion (the section b) of the crankpin through-hole 21 which has a relatively low rigidity has a constant inner diameter.

Figure 4:
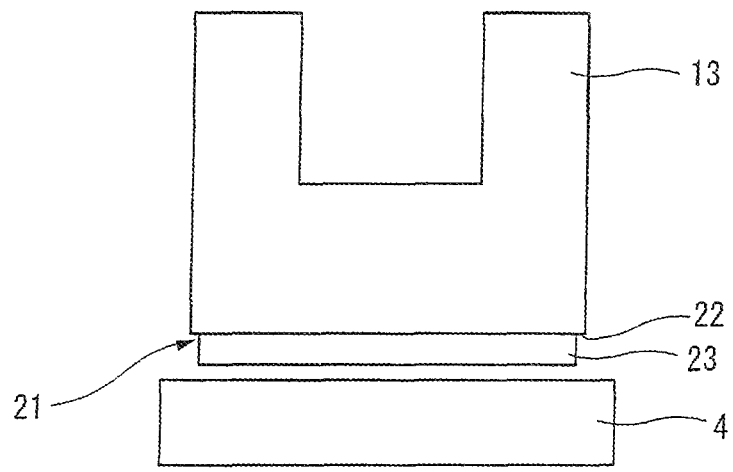
FIG. 4 An explanatory view schematically showing a state where no load input is applied to the lower link in a comparative example.
Figure 5:
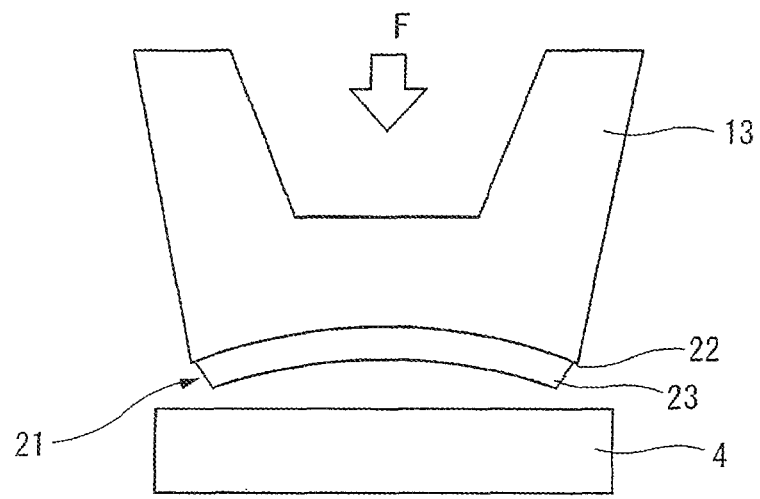
FIG. 5 An explanatory view schematically showing a state where load input is applied to the lower link in the comparative example.

FIGS. 4 and 5 show a comparative example. In the comparative example shown in FIGS. 4 and 5, the crankpin through-hole 21 is formed to have a constant (equal) inner diameter over an entire length of the crankpin through-hole 21 with respect to the axial direction of the crankshaft. Also in this example, the lower link 13 is formed such that rigidity of the outer circumferential portions of the both end portions of the crankpin through-hole 21 is higher than rigidity of the outer circumferential portion of the center portion of the crankpin through-hole 21 which corresponds to the bottom portion of the bifurcated shape. In this case, when the load input F caused by combustion load is applied to the lower link 13, the inner circumferential surface 22 of the crankpin through-hole 21 and the bearing metal 23 are deformed to protrude (bulge) in a radially outer direction of the crankpin through-hole 21. That is, at the time of load input, the both end portions of the crankpin through-hole 21 protrude relatively in the radially inner direction of the crankpin through-hole 21. As a result, the pressing force from the lower link 13 is not uniformly applied to the bearing metal 23 with respect to the axial direction of the crankshaft. Hence, axially both end portions of the bearing metal 23 which receive a relatively large pressing force from the lower link 13 are worn out. FIG. 4 is an explanatory view schematically showing the lower link 13 in the comparative example under the condition of no load input. FIG. 4 corresponds to the explanatory view schematically showing a part of the cross section of FIG. 1 taken along the line A-A. FIG. 5 is an explanatory view schematically showing the lower link 13 in the comparative example under the condition of application of the load input F. FIG. 5 corresponds to the explanatory view schematically showing a part of the cross section of FIG. 1 taken along the line A-A.

Contrarily, the lower link 13 in this embodiment is formed such that the inner circumferential surfaces 22a of the both end portions of the crankpin through-hole 21 which are deformed to relatively protrude (bulge) in the radially inner direction at the time of load input are located radially outward of the inner circumferential surface 22b of the center portion of the crankpin through-hole 21 under the condition of no load input, and such that the inner circumferential surface 22 of the crankpin through-hole 21 is made to extend straight in parallel with the axial direction of the crankshaft at the time of load input. Hence, even if the crankpin through-hole 21 is deformed at the time of load input, a surface pressure against the bearing metal 23 can be prevented from partially increasing. Accordingly, the bearing metal 23 can be inhibited from being partially worn out to a great degree.

In particular, when the load input F caused by the maximum combustion load is applied to the lower link 13, the inner circumferential surface 22 of the crankpin through-hole 21 becomes straight in the axial direction of the crankshaft. Hence, the surface pressure against the bearing metal 23 can be prevented from partially increasing, more reliably.

Because a partial abrasion (wear) of the bearing metal 23 can be suppressed, a lower-price material can be used as a material of the bearing metal 23.

It is also possible that an outer circumferential surface of the bearing metal 23 or an outer circumferential surface of the crankpin 4 is worked and shaped such that the pressing force from the lower link 13 is uniformly applied to the entire range of the bearing metal 23 with respect to the axial direction of the crankshaft at the time of load input. However, a working process for the crankpin through-hole 21 is easy and incurs a low working cost, as compared with a working process for the bearing metal 23 or the crankpin 4.

In a case that the crankpin through-hole 21 is formed by machine work using a drill or the like, each of the both end portions of the crankpin through-hole 21 usually has a substantially funnel shape. Hence, if the crankpin through-hole 21 is shaped to ensure a straightness as the comparative example shown in FIG. 4, a finish machining for eliminating the funnel shape is necessary. However, in this embodiment, this funnel shape can be used as a final shape of the inner circumferential surface of the crankpin through-hole 21. Therefore, in this embodiment, a machining time for the crankpin through-hole 21 can be shortened, so that the crankpin through-hole 21 can be formed at a lower cost.

When load input caused by a combustion load level lower than the maximum combustion load is applied to the lower link 13, a deformation amount of the lower link 13 is relatively small. At this time, an end-part side of each of both end portions of the inner circumferential surface 22 of the crankpin through-hole 21 is not elastically deformed and is not made to extend straight in the axial direction of the crankshaft, so that a clearance exists between the outer circumferential surface of the bearing metal 23 and the end-part side of each of the both end portions of the inner circumferential surface 22. However, even at this time, a center portion of the inner circumferential surface 22 and a part of the both end portions of the crankpin through-hole 21 which are in contact with the outer circumferential surface of the bearing metal 23 become (extend) straight in the axial direction of the crankshaft. Hence, the pressing force from the lower link 13 to the bearing metal 23 becomes uniform over the contact range of the lower link 13 with respect to the axial direction of the crankshaft. Moreover, according to the present invention, an entire range of the inner circumferential surface 22 of the crankpin through-hole 21 does not necessarily need to become straight in the axial direction of the crankshaft when the load input caused by the maximum combustion load is applied to the lower link 13. For example, a part of the inner circumferential surfaces 22a of the both end portions of the crankpin through-hole 21 may keep away from (i.e., not in contact with) the outer circumferential surface of the bearing metal 23 when the load input caused by the maximum combustion load is applied to the lower link 13.

Moreover, according to the present invention, the shape of the crankpin through-hole 21 is not limited to the above-mentioned shape of the first embodiment. For example, as shown in FIG. 6 as a second embodiment, the inner circumferential surface 22 of the crankpin through-hole 21 may be formed in a curved shape (bent shape) over its entire length with respect to the axial direction of the crankshaft. Also by this structure, when the load input caused by combustion load is applied to the lower link 13, the pressing force from the lower link 13 to the bearing metal 23 can become uniform with respect to the axial direction of the crankshaft. FIG. 6 is an explanatory view schematically showing a relevant part of the lower link 13 in the second embodiment under the condition of no load input. FIG. 6 corresponds to the explanatory view schematically showing a part of the cross section of FIG. 1 taken along the line A-A.

In this second embodiment, the inner circumferential surface 22 of the crankpin through-hole 21 is curved along (with respect to) the axial direction of the crankshaft at a curvature according to rigidity of the outer circumferential portion of the crankpin through-hole 21.

The inner circumferential surfaces 22a of the both end portions (section a and section c in FIG. 6) of the crankpin through-hole 21 are curved to protrude (bulge) in the radially inner direction of the crankpin through-hole 21 at a relatively large curvature under the condition that no load input is being applied to the lower link 13, because the outer circumferential portions of the both end portions (section a and section c in FIG. 6) of the crankpin through-hole 21 have a relatively high rigidity. Moreover, the inner circumferential surface 22b of the center portion (section b in FIG. 6) of the crankpin through-hole 21 is curved to protrude (bulge) in the radially inner direction of the crankpin through-hole 21 at a relatively small curvature under the condition that no load input is being applied to the lower link 13, because the outer circumferential portion of the center portion (section b in FIG. 6) of the crankpin through-hole 21 has a relatively low rigidity. Under the condition that no load input is being applied to the lower link 13, the inner circumferential surfaces 22a of the both end portions of the crankpin through-hole 21 are located radially outward of (i.e., located outward beyond) the inner circumferential surface 22b of the center portion of the crankpin through-hole 21.

Also in the second embodiment, the inner circumferential surface 22 of the crankpin through-hole 21 can become (extend) straight in the axial direction of the crankshaft as shown in the above-explained FIG. 3 when the load input F caused by the maximum combustion load is applied to the lower link 13. Therefore, operations and effects similar to the first embodiment can be obtained.

According to the present invention, the above-mentioned curve of the inner circumferential surface 22 of the crankpin through-hole 21 which is given along the axial direction of the crankshaft does not need to have a predetermined curvature. That is, the curve of the inner circumferential surface 22 may be formed in various curving shapes which are represented by, e.g., a quadratic function, a cubic function and the like.

What is claimed is:

1. A multi-link piston-crank mechanism for an internal combustion engine, comprising:
   an upper link connected through a piston pin with a piston;
   a lower link swingably connected through a first connecting pin with the upper link;
   a control link including one end swingably connected through a second connecting pin with the lower link; and
   a control shaft rotatably attached to a cylinder block, the control shaft including an eccentric shaft that swingably supports another end of the control link, wherein
   the lower link is formed with a crankpin through-hole through which a crankpin is passing, and
   the lower link is rotatably attached to the crankpin through a cylindrical bearing metal held in the crankpin through-hole,
   one end portion of the lower link is formed in a bifurcated shape to insert one end of the upper link into the bifurcated shape,
   inner diameters of both end portions of the crankpin through-hole are larger than an inner diameter of a center portion of the crankpin through-hole,
   the lower link is formed such that a rigidity of outer circumferential portions of the both end portions of the crankpin through-hole is higher than a rigidity of an outer circumferential portion of the center portion of the crankpin through-hole,
   inner circumferential surfaces of the both end portions of the crankpin through-hole are formed to be curved along an axial direction of a crankshaft, and
   an inner circumferential surface of the center portion of the crankpin through-hole is formed straight in the axial direction of the crankshaft under a condition in which no load is input to the lower link.

2. The multi-link piston-crank mechanism according to claim 1, wherein
   the inner circumferential surface of the crankpin through-hole becomes straight in the axial direction of the crankshaft over an entire length of the crankpin through-hole, when the piston receives a maximum combustion load.

3. A multi-link piston-crank mechanism for an internal combustion engine, comprising:
   an upper link connected through a piston pin with a piston;
   a lower link swingably connected through a first connecting pin with the upper link;
   a control link including one end swingably connected through a second connecting pin with the lower link; and
   a control shaft rotatably attached to a cylinder block, the control shaft including an eccentric shaft that swingably supports another end of the control link, wherein
   the lower link is formed with a crankpin through-hole through which a crankpin is passing, and
   the lower link is rotatably attached to the crankpin through a cylindrical bearing metal held in the crankpin through-hole, wherein
   one end portion of the lower link is formed in a bifurcated shape to insert one end of the upper link into the bifurcated shape,
   inner diameters of both end portions of the crankpin through-hole are larger than an inner diameter of a center portion of the crankpin through-hole,
   the lower link is formed such that a rigidity of outer circumferential portions of the both end portions of the crankpin through-hole is higher than a rigidity of an outer circumferential portion of the center portion of the crankpin through-hole,
   an inner circumferential surface of the crankpin through-hole is curved along an axial direction of the crankshaft at a curvature according to a rigidity of an outer circumferential portion of the crankpin through-hole, and
   the curvature is set such that a part of the outer circumferential portions of the both end portions of the crankpin through-hole which has a high rigidity has a curvature level larger than that of a part of the outer circumferential portion of the center portion of the crankpin through-hole which has a low rigidity.

4. The multi-link piston-crank mechanism according to claim 3, wherein
   the inner circumferential surface of the crankpin through-hole becomes straight in the axial direction of the crankshaft over an entire length of the crankpin through-hole, when the piston receives a maximum combustion load.

5. The multi-link piston-crank mechanism according to claim 3, wherein
   the part of the outer circumferential portion of the crankpin through-hole which has the low rigidity is a part of the outer circumferential portion of the center portion of the crankpin through-hole.

6. The multi-link piston-crank mechanism according to claim 3, wherein
   the curvature is set such that the part of the outer circumferential portions of the both end portions of the crankpin through-hole which has the high rigidity has the curvature level larger than that of the part of the outer circumferential portion of the center portion of the crankpin through-hole which has the low rigidity under a condition in which no load is input to the lower link.

* * * * *